July 2, 1940. W. H. TREXLER 2,206,438
INFLATABLE TORIC ARTICLE AND METHOD OF MAKING THE SAME
Filed May 5, 1937 2 Sheets-Sheet 2
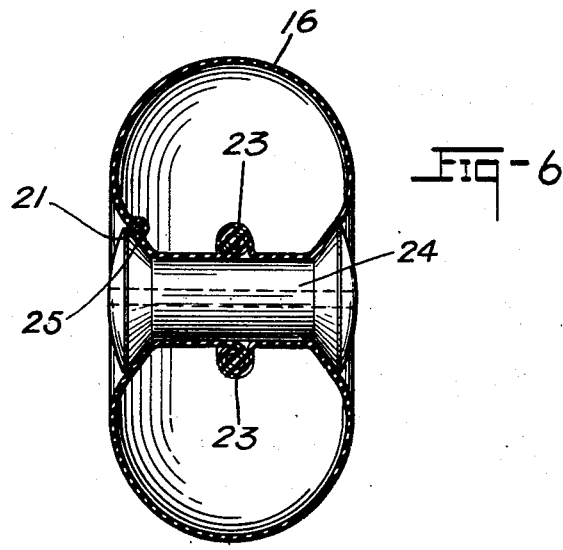
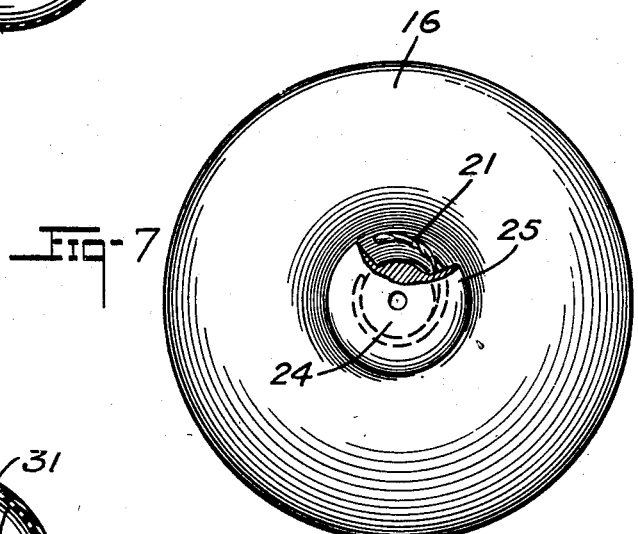
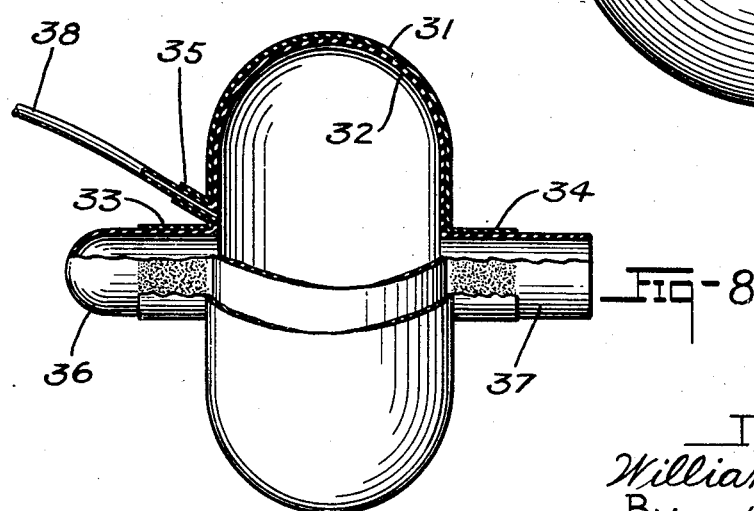
Inventor
William H. Trexler
By
Atty- Patented July 2, 1940

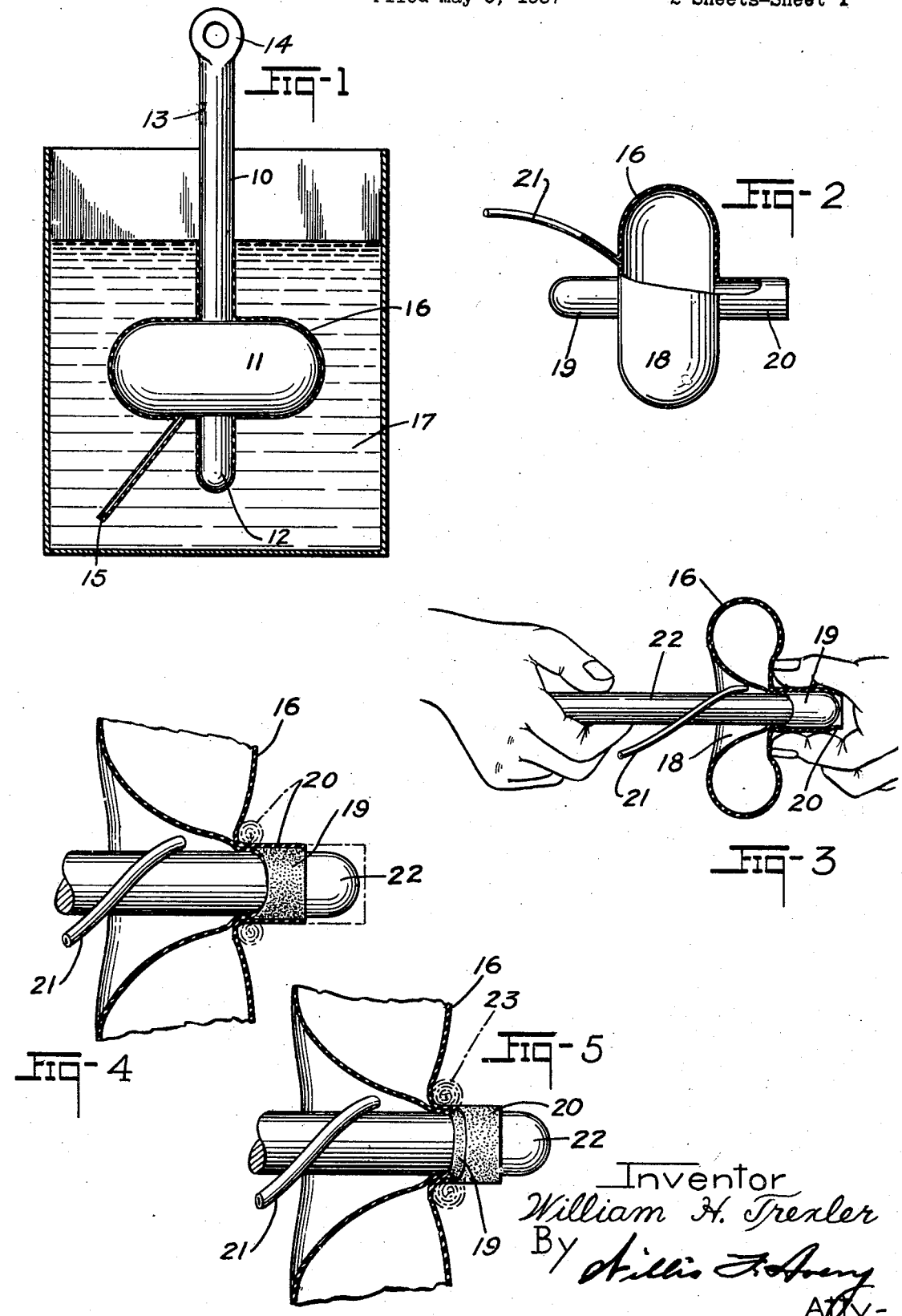

2,206,438

UNITED STATES PATENT OFFICE 2,206,438

INFLATABLE TORIC ARTICLE AND METHOD OF MAKING THE SAME

William H. Trexler, Ravenna, Ohio

Application May 5, 1937, Serial No. 140,843

17 Claims. (Cl. 154—14)

This invention relates to inflatable toric articles of rubber such as pneumatic tires, and especially to pneumatic tires for model aeroplanes, toy automobiles, wagons, and the like, and to methods for making such articles.

Many wheeled models and toys are now provided with pneumatic tires, not only to simulate more faithfully the larger prototypes but also to provide the highly efficient cushioning characteristic of pneumatic mountings. Such cushioning is especially desirable in tires for model aeroplanes, the amateur and professional building of which has in recent years assumed the proportions of a sizeable industry, but in so far as applicant is aware, no wholly satisfactory pneumatic tire for model aeroplanes and similar uses has heretofore been produced. The stringent limitations upon permissible weight demanding a simple structure, coupled with the necessity for a tire capable of holding substantial air pressures for fairly long periods of time and of successfully withstanding considerable abrasive wear as well as sudden severe shocks, and also the urgent need for a quickly removable and easily replaceable tire to facilitate repair or replacement in case of puncture or blowout, all combine to present an unusually difficult problem of design and manufacture which has not been successfully solved by the application of conventional expedients.

The chief objects of the present invention accordingly are to provide a light-weight but nevertheless thoroughly dependable pneumatic tire of unusually simple structure especially adapted for use on model aeroplanes and the like; to provide a quickly mountable and demountable inflatable tire for such use; to provide effective and economical procedure for manufacturing inflatable toric articles and especially for manufacturing inflatable tires; and generally to provide efficiency and economy in hollow toric articles and in the manufacture of such articles. The manner in which these and other objects of the invention are attained will be evident from the following description of a preferred embodiment of the invention as illustrated in the accompanying drawings, of which Fig. 1 is a sectional elevation illustrating an early step in the manufacture of a "balloon" type inflatable tire according to the present invention and showing a deposition form immersed, for receiving a coating, in a liquid rubber composition with a coating of rubber thereon;

Fig. 2 is an elevation, partially sectioned for clarity of illustration, showing the rubber coating after it has been stripped from the deposition form;

Fig. 3 is a partially sectioned elevation illustrating a further step in the process of the present invention;

Figs. 4 and 5 are partially sectioned fragmentary elevations illustrating succeeding steps in the process;

Fig. 6 is a front elevation showing a finished single-tube tire embodying the present invention mounted upon a hub and inflated, the tire being shown in vertical section for clarity of illustration;

Fig. 7 is a side elevation of the mounted tire and hub of Fig. 6, a portion of the hub being broken away to show the underlying inflating tube of the tire;

Fig. 8 is a front elevation, partially sectioned and broken away in places, showing a double-tube tire embodying the present invention in the process of construction.

As the construction of the tires illustrative of the present invention may be most clearly understood from a consideration of the method by which they are made, the manufacture of "balloon" type tires especially designed for use upon model aeroplanes will now be described. In the manufacture of such a tire or other toric article according to a preferred process, I provide a deposition form generally designated 10 and comprising a bulbous portion 11 of flattened spheroidal shape having a relatively short stem 12 of circular cross-section and rounded tip extending axially from one flattened face of the bulbous portion, and a second relatively longer stem 13 of similar circular cross-section extending axially in the opposite direction from the other flattened face of the bulbous portion and terminating in an eye 14 for supporting the form. A straight pin 15 of substantial length and relatively small diameter is provided, preferably extending at an angle of about 60° from a point in the lower flattened face of the bulbous portion adjacent the stem 12. The deposition form 10 may be made of any suitable material commonly used for such purposes, but preferably is made of some light-weight, non-corrodible metal such as aluminum.

In the process the deposition form 10 is provided with an enveloping coating of rubber 16, preferably by immersing the form 10 to a suitable depth along the stem 13 in a liquid rubber composition 17, which preferably is a suitably compounded aqueous dispersion of rubber such as natural rubber latex, and depositing the coating of rubber upon the immersed portions of the form. The deposition may be effected by simply dipping the form into the latex one or more times with intermediate drying, or the deposition may be accelerated by the use of heat and/or coagulants, or by electrophoretic means, or otherwise. Desirably, the form 10 is preliminarily coated with finely divided inert powder to facilitate subsequent stripping of the deposited rubber coating as described in U. S. Patent No. 1,924,214 granted to Edwin B. Newton August 29, 1933.

When a suitable thickness of rubber has been deposited upon the form 10, the rubber is dried, vulcanized, and stripped from the form, all according to conventional procedure, to provide a hollow rubber body (Fig. 2) corresponding to the shape of the deposition form and comprising a flattened bulbous portion 18 having a capsular stem 19 extending axially from one flattened face, a tubular stem 20 extending axially in an opposite direction from the other face, and a small flexible tube 21 extending from the flattened face of the bulbous portion 18 at a point adjacent the capsular stem 19. At any convenient stage of the process, the closed end of the tube 21 is opened as by simply cutting off a short length of the tube.

Next, the capsular stem 19 is inverted and telescoped within the tubular stem 20, preferably until the adjacent margins of the flattened walls of the bulbous portion 18 are brought into mutual contact, which may conveniently be accomplished (Fig. 3) simply by progressively forcing a mandrel 22 axially against the head of the capsular stem 19, while holding the tubular stem 20 stationary and in alignment with the mandrel. Thereafter, the rounded end of the capsular stem 19 and, if necessary, a portion of the overlying tubular stem 20, is cut off as indicated by the broken line in Fig. 4 to leave a fairly short combined tubular projection extending from one side of the bulbous portion. The tubular projection 20, now the outside layer of the combined tubular projection, then is rolled back to expose the remaining portion of the underlying capsular projection 19, now the inside layer of the combined tubular projection (Fig. 4), and the exposed surface of the latter or inside layer is coated with rubber cement or other suitable adhesive and the outside layer 20 then is unrolled. The exposed surface of the outside layer 20 is then likewise coated with rubber cement (Fig. 5) and the combined tubular extension is tightly rolled upon itself to form a tight rolled seal or seam as indicated by the broken lines at the numeral 23 in Fig. 5 and as shown more clearly in Fig. 6.

As a result of this procedure, there is produced a toric rubber article having a single rolled seam 23 at the inner circumference of the tore and which is closed except for the tube 21, which is to be used for inflating the article. If the article is to be used as a tire for model aeroplanes, it is preferably mounted upon a hub 24, which may be simply a wooden spool having a diameter approximately equal to the inner diameter of the toric article and a length somewhat less than the inflated width of the article, and the article is inflated to a desired air pressure by means of the tube 21. For retaining the air pressure in the tire, the inflating tube 21 may be twisted upon itself and wrapped in the twisted condition, with incidental stretching, about the end of the hub between the inflated tire and the shoulder 25 of the hub (Fig. 7) where it is effectively clamped in place by the inflation pressure and is neatly concealed from view by the shoulder of the hub. Desirably, although not necessarily, the inflating tube is made sufficiently long to wrap around at least the major part of the hub circumference. This extremely simple sealing method retains the air pressure in the tire substantially undiminished for long periods of time and entirely eliminates undesirable heavy and unsightly valves.

When single tube tires of the type described are made directly from liquid rubber latex and therefore embody the tough, high tensile, and general high quality characteristics of unmasticated latex rubber, wall thicknesses as low as 0.010 inch have been utilized with entire satisfaction in tires for light-weight model aeroplanes. Such a tire obviously approaches the ideal absolute minimum weight highly desirable for model aeroplanes. For heavier models or for other uses entailing more severe service conditions, the tire may be made heavier and thicker, as required, simply by depositing a heavier and thicker deposit of rubber upon the deposition form from the latex. If the thickness of the deposit is greatly increased, however, the inflating tube 21, which ordinarily has the same wall thickness as the rest of the article, may become unduly thick with consequent loss of flexibility desirable for tight twisting and wrapping of the tube for sealing purposes, and other difficulties also may be encountered in manipulating and repairing a tire with thick heavy walls.

Accordingly, for heavier service, as for example for use upon a gasoline-powered model aeroplane, a double-tube tire has been devised. In making such a double-tube tire (Fig. 8), two hollow rubber bodies 31, 32, each like the previously described body 16 shown in Fig. 2, are prepared in the manner described. In one of the bodies, 31, the capsular stem and the tubular stem each is cut off to leave fairly short oppositely extending tubular stems 33, 34, and the flexible tube corresponding to the inflating tube 21, is cut off a short distance from the wall of the body proper to leave a short tubular projection 35. The second hollow body 32 is then placed inside the first body 31, in nested relation thereto with its capsular stem 36 telescoped within the tubular stem 33 of the first body, with its tubular stem 37 telescoped within the tubular stem 34 of the first body, and with the inflating tube 38 extending through the short tubular projection 35 of the first body. Coatings of rubber cement or other suitable adhesive then are applied between the capsular stem 36 and the overlying tubular stem 33 and between the two tubular stems 34, and 37, as before, by rolling back the overlying rubber to expose the underlying surfaces. When the adhesive bond between the stems has become firmly set, manufacture of the tire is continued through successive steps in the same manner as in manufacturing the single tube tire to produce a tire similar to the single tube tire except for the double-tube or double-wall structure.

Although it is of course possible, for perfect fitting, to make the outer of the two rubber bodies constituting the double-tube tire slightly larger than the inner body, this has been found to be unnecessary, and in fact undesirable when both bodies are fairly thin as for example from 0.010 to 0.020 inch in thickness, as the tensioning or gripping effect resulting from the slightly smaller inside dimension of the outer body with respect to the outside dimension of the inner body, serves to maintain the two tubes, especially when inflated, in tight mutual relation throughout their entire contacting surfaces, and to cause the outer short tubular projection 35 to grip tightly the within inflating tube 38 and thereby to assist materially in retaining the air pressure in the tire.

The invention accordingly attains to a high degree the objects set forth. Using a light-weight wooden hub, a typical combined tire and hub assembly weighs less than half an ounce, and the weight of the tire itself is practically negligible. Yet the tire is highly dependable and gives excellent service with, of course, superior cushioning. The tires can be quickly and easily mounted and demounted for replacement or repair without disturbing the mechanical structure of the model. The novel procedure for making the tires is exceptionally simple when the relative complexity of the finished product is considered, which assures economy and efficiency in manufacture.

While the invention has been described in considerable detail with reference to small pneumatic tires for model aeroplanes and the like, it is to be understood that the principles of the invention as herein set forth may be utilized in manufacturing larger tires, as well as numerous other toric articles such as invalid cushions, toy balloons, inner tubes for pneumatic tires, and the like. Likewise numerous modifications and variations in the details of procedure and materials as herein described may be made without departing from the spirit and scope of the invention. All such modifications, variations and uses are contemplated by the appended claims unless otherwise indicated.

I claim:

1. A wheel and pneumatic tire assembly comprising, in combination, a hub having shoulders thereon, an inflated toric rubber body mounted upon the hub between the shoulders, and an inflating tube for the body clamped, by pneumatic pressure, between the body and one of the shoulders.

2. A double-tube pneumatic tire for small wheeled objects, comprising two similar bulbous-shaped bodies of rubber, each having two axial tubular stems, in nested relation with all the stems brought together in adhesive union to form the inner circumference of the tire.

3. The method of making a hollow toric rubber article which comprises producing, by deposition from a liquid rubber composition upon a suitable deposition form, a bulbous hollow body of rubber having an outer periphery corresponding to the outer periphery of the desired tore, and bringing generally opposed central portions of the said body into permanent union, thereby to form the inner periphery of the tore.

4. The method of making a hollow toric rubber article which comprises producing a bulbous hollow body of rubber having a tubular stem, and permanently uniting the said stem with an oppositely disposed portion of said body, thereby to form the inner periphery of the desired tore with the outer periphery of the said body constituting the outer peripherery of the tore.

5. The method of making a hollow toric rubber article which comprises producing a bulbous hollow body of rubber having integral tubular stems extending from the body at two generally opposed central points, and telescoping one stem within the other.

6. The method of making a hollow toric rubber article which comprises producing a bulbous hollow body of rubber having integral tubular stems extending from the body at two generally opposed central points, telescoping one stem within the other, permanently uniting the telescoped stems, and rolling the resultant combined tubular stem upon itself.

7. The method of making a hollow toric rubber article which comprises producing a bulbous hollow body of rubber having a tubular stem and an oppositely extending capsular stem, inverting the capsular stem and telescoping the inverted capsular stem within the tubular stem, permanently uniting the telescoped stems, and opening the closed end of the capsular stem.

8. The method of making a hollow toric rubber article which comprises producing a bulbous hollow body of rubber having a tubular stem extending axially from one flattened face of the body and a capsular stem extending axially from the other flattened face of the body, inverting the capsular stem and telescoping the inverted capsular stem within the tubular stem, removing the closed end of the capsular stem, adhesively uniting the telescoped stems, and rolling the resultant combined tubular stem upon itself to form a tight rolled seam.

9. The method of making a hollow toric rubber article which comprises producing a bulbous hollow body of rubber having integral tubular stems extending from the body at two generally opposed central points, telescoping one stem within the other, adhesively uniting the telescoped stems, applying adhesive to an exposed surface of the combined tubular stem, and rolling the combined tubular stem upon itself to form a tight rolled and adhesively sealed seam.

10. The method of making an inflatable toric rubber article such as a pneumatic tire for small wheeled objects, which comprises producing, by deposition from a liquid rubber composition upon a suitably shaped deposition form, a bulbous hollow rubber body having an outer periphery corresponding to the outer periphery of the desired toric article and having an integral flexible inflating tube extending from the body, and bringing generally opposed central portions of the said body into permanent union, thereby to form the inner periphery of the tore.

11. The method of making a pneumatic tire for small wheeled objects, which comprises providing a deposition form comprising a bulbous portion corresponding generally to the shape of the desired tire and having two circular stems extending axially therefrom in generally opposed directions, coating the form with a liquid rubber composition and solidifying the coating thereon to produce a hollow rubber body corresponding to the shape of the form and comprising a bulbous hollow body having two oppositely extending axial tubular stems, stripping the rubber body from the form, telescoping one of the tubular stems within the other, permanently uniting the telescoped stems, and providing means for inflating the tire.

12. The method of making a pneumatic tire for small wheeled objects, which comprises producing, by deposition from a liquid rubber composition upon a suitably shaped deposition form, a hollow bulbous deposit of unitary structure having a closed outer periphery corresponding substantially to the outer periphery of the tire, and uniting opposed central portions of the deposit, thereby to form a closed inner periphery for the tire.

13. The method of making a toric hollow rubber article having walls comprising a plurality of separate layers which comprises forming a plurality of similarly shaped bulbous bodies of rubber having outer peripheries corresponding generally to the outer periphery of the desired tore, nesting the said bodies, and permanently uniting opposed central portions of the nested bodies, thereby to form the inner periphery of the tore.

14. The method of making a double-tube pneumatic tire for small wheeled objects, which comprises producing two similarly shaped bulbous bodies of rubber, each having integral tubular stems extending from the body at two generally opposed central points, nesting one of said bodies within the other with the respective corresponding tubes in telescopic relation, inverting one pair of telescoped tubes and bringing the inverted telescoped tubes into telescopic relation with the other pair of telescoped tubes and permanently uniting all the telescoped tubes, thereby to form a sealed inner periphery for the tire.

15. A wheel and pneumatic tire assembly for small wheeled objects such as model aeroplanes, toys and the like, comprising, in combination, a hub having spaced-apart circumferential shoulders thereon and an inflated pneumatic tire removably mounted on said hub between said shoulders, said tire comprising a unitary integral body of rubber in hollow toric form and an inflating tube extending from the body at a point adjacent one of said shoulders, the inflating tube being clamped between the said shoulder and the inflated body for preventing escape of inflating fluid from the tire, the weight of the wheel and tire assembly being less than one ounce.

16. A hollow toric article comprising an integral unitary body of rubber, said body including a bulbous portion, an inflating tube extending from the bulbous portion, and two stem portions disposed generally centrally of the bulbous portion, the stem portions being telescoped together and rolled in adhesive relation providing a compact rolled seam adjacent the inner circumference of the tore, the article being inflatable by injection of fluid through the inflating tube.

17. A pneumatic tire assembly comprising, in combination, an inflated pneumatic tire and a support therefor having a rim-like portion engaging the inner periphery of the tire, the tire comprising an integral, unitary body of rubber including a bulbous portion, a valveless inflating tube extending from the bulbous portion, and at least one stem portion disposed centrally of the bulbous portion, the stem portion being adhesively associated in fluid-tight relation with an opposed portion of the tire to provide a compact seam extending along the inner periphery of the tire at a point in contact with the support whereby the seam is concealed from view, the inflating tube being clamped between the inflated body and the support for preventing escape of inflating fluid from the tire.

WILLIAM H. TREXLER.